Feb. 17, 1925.                                                1,526,406
C. E. WISHERD
MAXIMUM SPEED CONTROL FOR MOTOR VEHICLES
Filed April 30, 1923    2 Sheets-Sheet 2

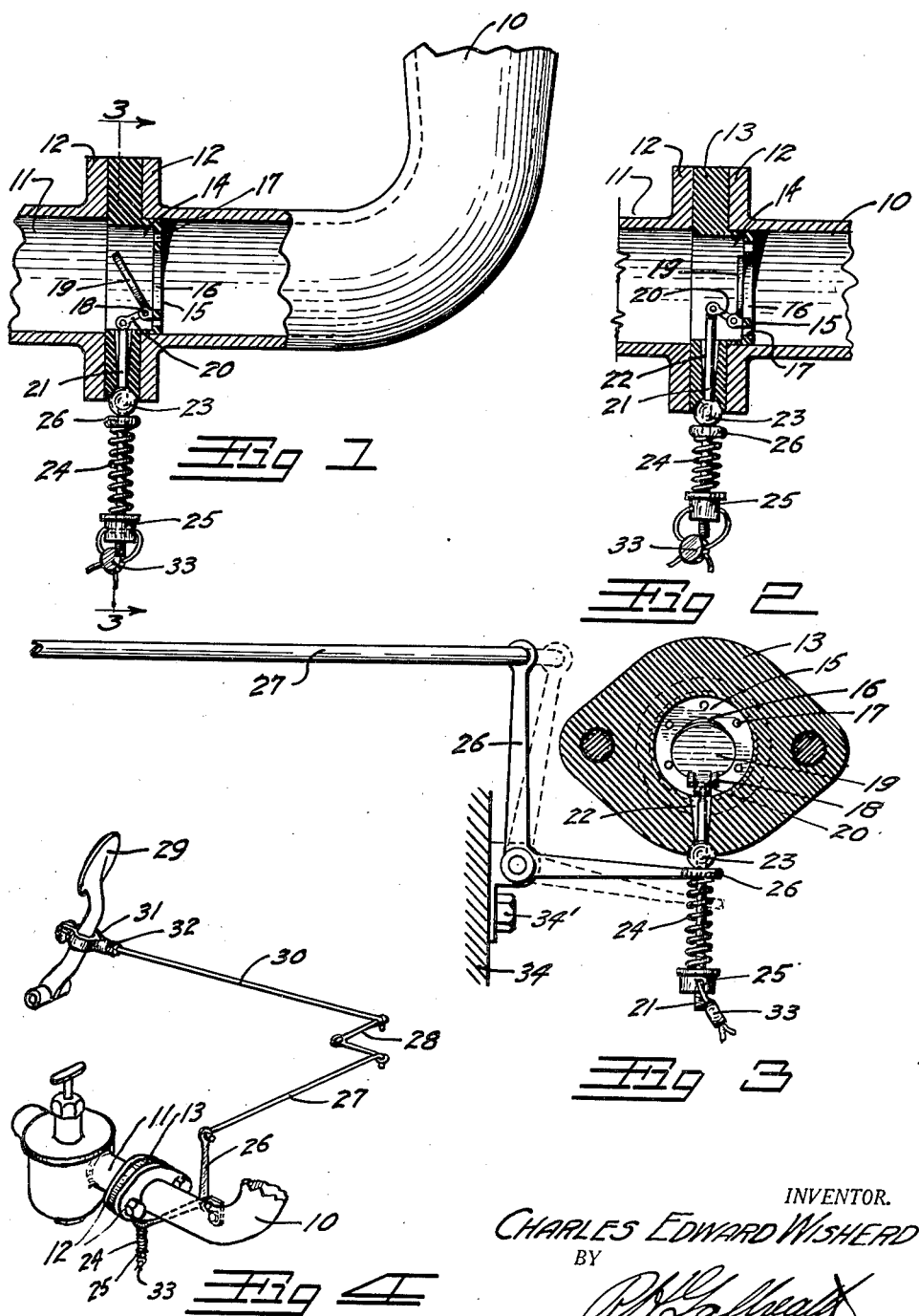

INVENTOR.
CHARLES EDWARD WISHERD
BY
ATTORNEY.

Patented Feb. 17, 1925.

1,526,406

UNITED STATES PATENT OFFICE.

CHARLES EDWARD WISHERD, OF DENVER, COLORADO.

MAXIMUM-SPEED CONTROL FOR MOTOR VEHICLES.

Application filed April 30, 1923. Serial No. 635,779.

*To all whom it may concern:*

Be it known that I, CHARLES EDWARD WISHERD, a citizen of the United States of America, residing at Denver, in the county of Denver and State of Colorado, have invented certain new and useful Improvements in Maximum-Speed Controls for Motor Vehicles, of which the following is a specification.

This invention relates to means whereby the speed of a motor vehicle can be limited to a certain predetermined maximum and has for its principal object the provision of a device of this character in which the speed of the engine can be increased when the transmission is in low gear.

A further object of the device is to provide a device of this character which will not limit the pulling power of the machine when the car is travelling below the maximum speed.

A still further object is to provide a speed control which can be quickly and easily installed upon present types of automobiles without the necessity of changing the present construction.

Other objects and advantages reside in the detailed construction of the invention, which result in simplicity, economy and efficiency, and which will become more apparent from the following description.

In the following detailed description of the invention reference is had to the accompanying drawing which forms a part hereof. Like numerals refer to like parts in all views of the drawing and throughout the description.

In the drawing:—

Fig. 1 is a cross sectional view of the connecting flanges between the carburetor and the intake manifold of an internal combustion engine, showing the invention in place. In this view, the device is in the position it maintains while the automobile is traveling below the maximum speed.

Fig. 2 is a similar cross sectional view showing the device in the past-maximum speed position.

Fig. 3 is a vertical cross section taken on the line 3—3 Fig. 1.

Fig. 4 is a perspective view showing the method of connecting the invention with the low gear pedal of certain automobiles, whereby speeding of the engine is allowed in low gear. In this view only the necessary parts of the automobile are shown.

Figure 5:
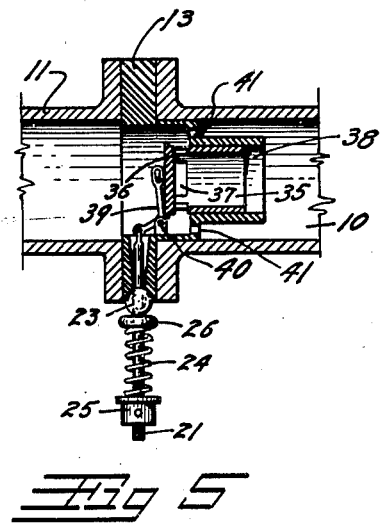
Fig. 5 is a cross sectional view of the invention employing an alternate form of valve.

Let the numeral 10 designate an intake manifold of an internal combustion engine and the numeral 11 the carburetor outlet. Manifold 10 and carburetor outlet 11 are usually connected by means of coacting flanges 12, secured thereon. The invention is attached between these flanges 12 and consists of a relatively thick gasket 13 carrying a cylindrical projection 14 equal in diameter to the internal diameter of the intake manifold.

Projection 14 is closed at its extremity by a circular plate 15. Plate 15 contains a large concentric opening 16 surrounded by a series of smaller openings 17.

Hinged to the plate 15 as shown at 18 is a circular flap or valve 19 which is adapted to close the opening 16. Valve 19 is provided with an angularly disposed arm 20, pivoted to a rod 21 which passes through an opening 22 in the gasket 13 and projects therebelow.

Opening 22 is kept closed by means of a ball 23 which rests in a ball seat in the gasket 13 and through which the rod 21 passes. A spring 24 acts to constantly pull upon the rod 22 by exerting pressure upon a nut 25 threaded thereon, thereby tending to retain the valve 19 in the open position as shown in Fig. 1.

The intake gases in their flow from the carburetor to the intake manifold constantly exert pressure against the valve 19 and when the velocity of the gases has reached a certain point, they will force the valve 19 to the closed position shown in Fig. 2, against the compression of the spring 24.

The compression of the spring 24 can be so adjusted, by means of the nut 25, that the valve 19 will close at any predetermined speed of the engine. In order to allow the engine to be speeded above this point for low gear work, a bell crank lever 26 is secured to the cylinder block, one extremity of which surrounds the rod 21 above the spring 24, the other extremity being connected, by means of a rod 27, to a similar horizontal bell crank lever 28, secured on the opposite side of the engine block, which in turn connects to the low gear pedal 29 of the automobile by means of an adjustable rod 30, and a clamp 31.

From Fig. 4 it will be noted, that when the low gear pedal is depressed and the transmission thrown into low, the series of rods and levers above described will act to compress the spring 24 thereby requiring a greater velocity of gas in the intake manifold to close the valve 19. This allows the engine to be speeded to a much higher degree when the automobile is required to do hard pulling in low gear.

The clamp 31 is threaded on the rod 30 and can be adjusted thereon and locked at any desired position by means of a lock nut 32, so that the maximum degree of speed allowed in low gear can be adjusted as desired. The rod 27 passes to the opposite side of the engine through the opening in the cylinder block, 34, between the second and third cylinders.

As illustrated and described, the invention has been applied to automobiles having planetary transmissions. It is, however, equally applicable to automobiles having the selective sliding gear transmissions in which case the series of rods and levers are connected to the gear shift lever of the automobile where similar results can be obtained.

Nut 25 and rod 21 can be drilled to receive a seal 33 to prevent the adjustment of the device from being changed after it has once been set. If desired, a cover could be provided to cover the projecting portion of the rod 21 and this cover locked in place to prevent tampering.

After the engine has passed the maximum set speed and the valve 19 has closed, gas will still flow to the engine through the smaller openings 17 to prevent it stopping and stalling the automobile.

It will be noted that the opening 22 is enlarged towards its interior end to allow for the swing of the rod 21 upon the arm 20.

On certain types of automobile engines there is a cap screw 34, in the engine block which can be utilized to secure the bell crank lever 26. Bell crank lever 28 is secured by a bolt used on certain automobiles to hold the cylinder block to the crank case. It is therefore, unnecessary to drill or tap new openings for this device or change the present construction in any way.

Figure 6:
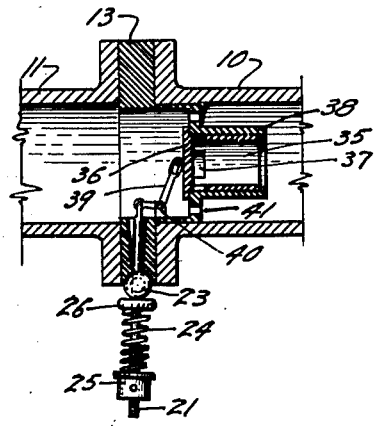
Fig. 6 is a similar view showing the valve in the closed position.
Figure 7:
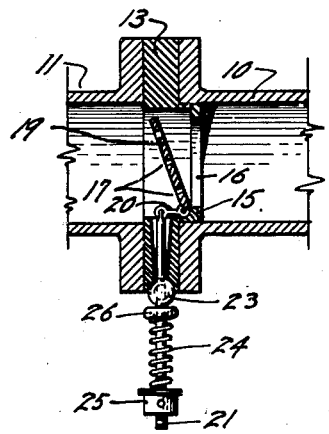
Fig. 7 is a cross sectional view of still another method of forming the valve.

If desirable, the valve 19 and the opening 16 may be made larger and the smaller openings 17 placed in the valve 19, as shown in Fig. 7. This form has been found desirable in certain types of automobiles where the restriction of the manifold opening in the former described type interferes with the action of the engine, as with its use, the opening is but slightly restricted. In Figs. 5 and 6 the invention is illustrated with an alternate form of valve designated by the numeral 35. This valve consists of a cylinder having a closed end 36 and provided with openings 37 adjacent said closed end. Cylinder 35 is slidably mounted in a cylindrical seat 38 carried by the gasket 13. A small bell crank lever 39 is pivoted, as shown at 40, and connects at one extremity with the rod 21 and at the other extremity with the valve cylinder 35.

The pressure of the moving gas against the closed end 36 tends to force the cylinder 35 in its seat 38, thereby closing the openings 37 as shown in Fig. 6, and shutting down the supply of gas to the engine. Auxiliary openings 41 are provided either as shown in the drawings or in the closed end to prevent stopping of the engine when the valve 35 closes.

While the specific form of the improvement has been described and illustrated herein, it is desired and understood that the same may be varied, within the scope of the appended claims, without departing from the spirit of the invention.

Having thus described the invention, what is claimed and desired secured by Letters Patent is:—

1. A speed control for motor vehicles comprising a gasket arranged for placing between the carburetor and intake manifold of the engine of said vehicle; a valve seat arranged on said gasket; a valve acting on said seat to control the volume of the intake gases; a rod operatively connected with said valve and passing to the exterior of said gasket; a spring arranged on said rod for holding said valve in the open position; a nut threaded on said rod for the purpose of adjusting the action of said spring and a ball arranged on said rod, said ball being held in a ball seat in said gasket to prevent leakage around said rod.

2. The combination with a speed control for motor vehicles comprising a valve controlling the gas supply to the engine of said vehicle, said valve being located in the intake manifold of said engine and actuated by the pressure of the inbound gases; a spring arranged to hold said valve in the open position; of means acting on said spring and connected to the gear shift lever of said vehicle so as to cause said spring to offer greater resistance to the closing of said valve when the vehicle is operating in low gear.

3. A speed control for motor vehicles comprising a gasket arranged for placing between the carburetor and intake manifold of the engine of said vehicle; a valve seat arranged on said gasket; a valve acting on said seat to control the volume of the intake gases, said valve comprising a flap pivoted to said seat and adapted to be closed by the action of said gases; an arm secured to said valve; a rod pivoted to said arm and extending radially to the exterior through said gasket; a spring arranged on said rod for holding said valve in the open position and means for adjusting the action of said spring.

4. A speed control for internal combustion engines comprising a gasket arranged to be placed between the intake manifold and the carburetor; a cylindrical projection on said gasket arranged to fit within said manifold and provided with an opening; a flap hinged within said gasket and arranged to close said opening; an arm secured to said flap; a threaded rod secured to said arm and projecting through the edge of said gasket and a spring compressed between said gasket and a nut on said threaded rod.

5. The combination of a gas actuated speed control for internal combustion engines having a projecting operating rod and regulating spring; a bell crank lever, one extremity of which contacts with said spring; a clamp adapted to be secured to the gear shift lever of an automobile and connecting means connecting said clamp to the other extremity of the bell crank lever.

In testimony whereof I affix my signature.

CHARLES EDWARD WISHERD.